March 31, 1970     R. P. STANTON     3,503,114
TOOL FOR SPREADING APART THE ENDS OF A ZIPPER SLIDE
Filed July 25, 1967
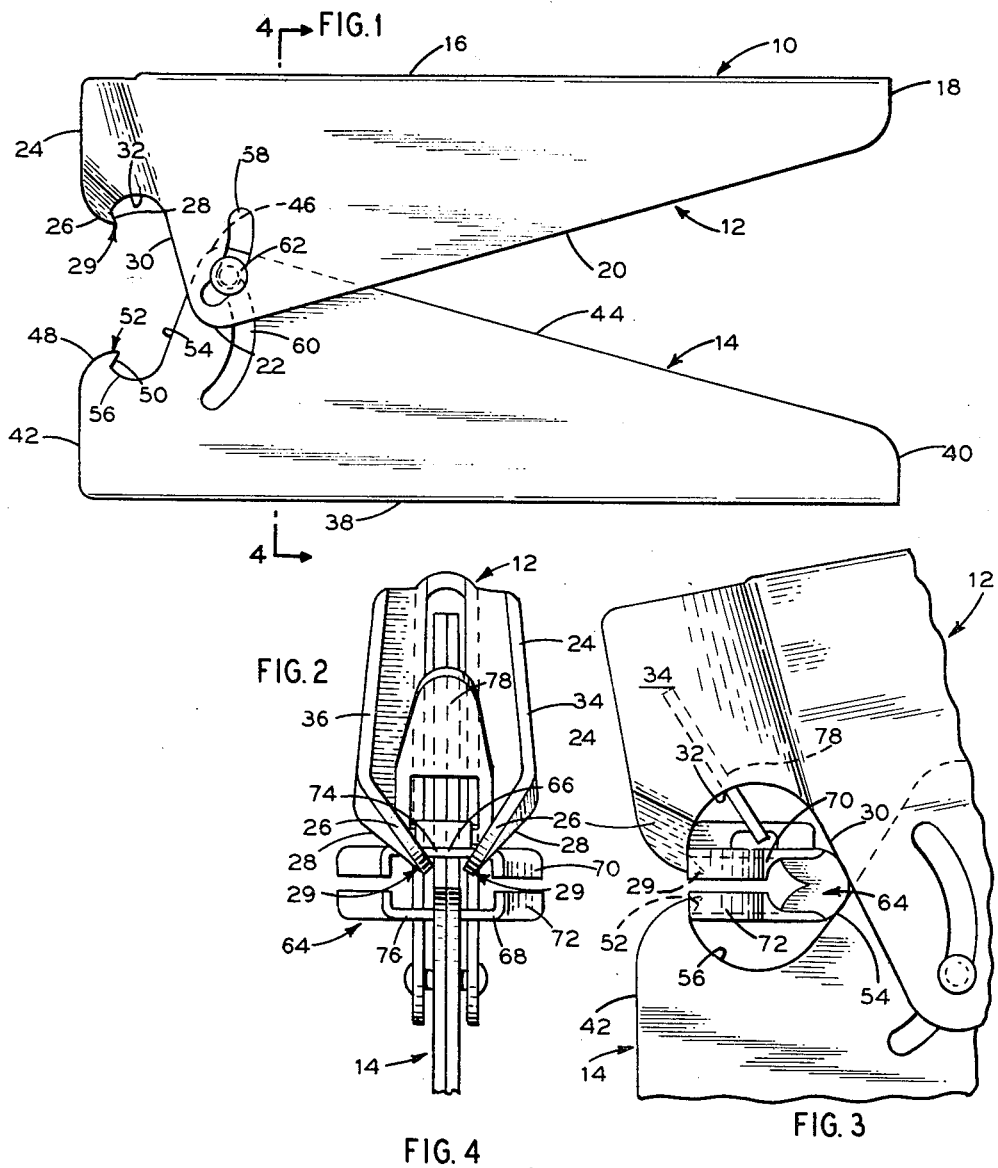
INVENTOR.
Robert P. Stanton
BY
ATTORNEY

United States Patent Office 3,503,114
Patented Mar. 31, 1970

3,503,114
TOOL FOR SPREADING APART THE ENDS OF A ZIPPER SLIDE
Robert P. Stanton, 65 Mayflower Ave., Williston Park, N.Y. 11596
Filed July 25, 1967, Ser. No. 655,951
Int. Cl. B23p 19/04
U.S. Cl. 29—207.5                                            7 Claims

ABSTRACT OF THE DISCLOSURE

A tool for spreading apart the halves of a zipper slide which includes two members each one of which is provided with a hook-shaped portion adapted to engage the respective free ends of the slide. The members are further provided with complementary formed surfaces opposite the hook-shaped portion which are adapted to engage the slide to move the free ends of the slide toward the hook-shaped portions when the members of the tool are moved toward each other to firmly lock the slide in place during the operation of the tool. Further movement of the members toward each other causes the members to spread or pry apart the free ends of the slide so that the slide may be removed or loosened.

This invention relates generally to a tool for slide fasteners and, more particularly, pertains to a tool for removing the slide from a slide fastener so that the same may be repaired or replaced, or for freeing a jammed slider.

A common fault with slide fasteners or "zippers" is that they are continually subject to jamming. For example, a piece of fabric may become wedged between the slide and the fastening elements, or either the slide or the fastening elements may become distorted thereby rendering the fastener unfit for its intended use. The foregoing and similar faults make it necessary to remove the slide from the fastening elements per se to either fix or replace the slide, or to loosen the slide without removing it.

In the past, any pointed object which was at hand was utilized to remove the slide from the fastening elements. This operation was accomplished by inserting a screwdriver, a knife blade or other pointed object between the halves of the slide or between the slide and fastening elements and the free ends of the slide were then forced apart. However, this procedure usually resulted in an uneven spacing between the top and bottom portions of the slide thereby rendering the slide unfit for re-use. More important, it resulted in damaged zipper teeth and/or tape.

In order to ameliorate the above situation, various mechanical devices have been proposed for removing the slide from the fastening elements in a slide fastener so that the slide may be used again or replaced with another. However, the majority of these devices fall short of their intended purpose in that they damage the slide or the fastening elements or both. A further disadvantage is that they are cumbersome and difficult to operate properly and, for the most part, they are expensive.

Accordingly, an object of the present invention is to provide a slide removing tool for a zipper which is easy to operate.

Another object of the invention is to provide a tool which is simple in construction and reliable in operation.

A further object and feature of the present invention resides in the novel details of construction which provide a tool of the type described which may be utilized to expeditiously remove a slide from the fastening elements of a slide fastener or loosen the slide with respect to the fastening elements in one simple operation.

In furtherance of the above objects, the tool of the present invention includes a first and a second member movable toward and away from each other. Each member is provided with a hook-shaped portion which is adapted to engage the respective free ends of the upper and lower portions of a slide. The members are further provided with complementary formed surfaces opposite the hook-shaped portions which are adapted to engage the slide and force the slide toward the hook-shaped portions when the members are moved toward each other. Continued movement of the members toward each other causes the members to pivot about one end of the slide and spread or pry apart the free ends of the slide.

A feature of the present invention is to provide a tool for spreading apart the halves of a slide which includes complementary formed surfaces which coact to cause a slide to be claimed firmly in place during the operation of the tool.

Other features and objects of the present invention will become more apparent from a consideration of the following detailed description when taken in combination with the accompanying drawings, in which:

FIG. 1 is a side elevational view of a tool constructed in accordance with the present invention, illustrating the members in the open position;

FIG. 2 is a front elevational view thereof to an enlarged scale, showing the members in operative position engaging a slide;

FIG. 3 is a side elevational view of the tool shown in FIG. 1 to an enlarged scale, illustrating a slide received between the members with parts broken away; and FIG. 4 is a sectional view taken along line 4—4 of FIG. 1.

The tool of the present invention is designated generally by the numeral 10 in FIG. 1 and comprises an upper member 12 and a lower member 14 which are movable toward and away from each other. To be more specific, the upper member 12 is elongated in shape and has a substantially straight upper edge 16 which terminates at a substantially straight rear surface 18, The lower edge 20 of the member 12 is inclined downwardly and forwardly and terminates at a curved portion 22.

The upper edge 16 of the member 12 also extends to a substantially straight forward edge 24. The forward edge 24 terminates, at the bottom thereof, in a convex inwardly or rearwardly curved section 26. Connected to the terminal point of the curved section 26 is a sharply angulated edge 28 which is inclined forwardly and upwardly. The edge or surface 28 and the curved section 26 define an inwardly or rearwardly directed upper hook-shaped portion 29 of the member 12 which is adapted to engage the upper free end of a zipper or slide fastener slide in the manner indicated in detail below.

The surface or edge 28 is connected to a downwardly and rearwardly inclined surface 30 by a concave upward surface 32. In other words, the surface 30 is inclined away from the hook-shaped portion 29. The inclined surface 30 merges smoothly with the curevd portion 22.

As shown in FIG. 4, the member 12 is channel-shaped and the left-hand and right-hand portions of the member 12, as taken in FIG. 4, are similar. The hook-shaped portion 29 of each side of the member 12 are located in resepective opposed projections 34 and 36 (see FIG. 2). The projections 34 and 36 are spaced apart a sufficient distance to accommodate the operating lever of a zipper slide therebetween, as noted in detail below. Additionally, the hook-shaped portions 29 of the projections 34 and 36 are bent inwardly toward each other so that the space between the end points of the portions 29 is less than the length of the free end of a slide.

The lower member 14 is substantially an inverted image of the upper member 12. More specifically, the lower member 14 is provided with a longitudinally extending lower edge 38 which terminates at the rear edge or surface 40 and at the forward edge 42 of the member. The upper edge 44 of the member 14 is inclined upwardly and forwardly and terminates at a curved portion 46.

The front or forward edge 42 of the member 14 terminates in a convex inwardly or rearwardly curved section 48 which, in turn, is connected to a downwardly and forwardly sharply inclined edge 50. The section 48 and the edge 50 define an inwardly or rearwardly directed lower hook-portion 52 which is adapted to engage the lower free end of the slide of a slide fastener. The edge 50 is connected to an upwardly and rearwardly inclined surface 54, which is formed complementary to the surface 30 of the upper member 12, by a concave downward surface 56. The inclined surface 54, which is inclined away from the hook-shaped 52, merges smoothly with the curved portion 46.

The lower member 14 is substantially flat, as shown in FIG. 4, so that the same may be slidably received within the channel shaped upper member 12.

As noted above, the members 12 and 14 are movable toward and away from each other. The member 12 is provided with an arcuate slot 58 adjacent the surface 30 and the member 14 is provided with an arcuate slot 60 adjacent the surface 54. A rivet 62 extends through the slots 58 and 60 to connect the members together so that they are movable with respect to each other. Alternatively, only one of the members need be provided with an arcuate slot. Moreover, the slot or slots need not necessarily be arcuate as long as the members are movable with respect to each other.

In order to facilitate an understanding of the tool 10 of the present invention, it is believed that it will be helpful at this point to discuss the operation of the slide of a slide fastener. Accordingly, a slide 64 is shown in FIGS. 2 and 3. In the interest of clarity, the tape and fastening elements of the zipper are not shown. The slide is substantially U-shaped in elevation to define an upper portion 66 and a lower portion 68. The upper portion 66 is provided with a depending flange 70 and the lower portion 68 is provided with an upstanding flange 72. Moreover, the upper and lower portions terminate in respective free ends 74 and 76. Thus, the top and bottom portions of the slide 64 adjacent the free ends 74 and 76 are substantially U-shaped in cross section. Additionally, the width of the channel portions of the slide 64 is such as to force the teeth or fastening elements of the slide fastener to which it is attached into meshing engagement, in the conventional manner. Pivotally mounted on the top surface of the slide 64 is an operating lever 78 which is adapted to facilitate operation of the slide to open or close the slide fastener.

In operation, the members 12 and 14 of the tool 10 are moved away from each other by means of the movable connection formed by the rivet 62 and the arcuate slots 58 and 60 and the slide 64 is inserted between the hook-shaped portions 29 and 52 of the respective members with the free ends 74 and 76 of the slide 64 facing forwardly. The members 12 and 14 are then moved together until the hook-shaped portion 52 is hooked over the free end 76 of the slide, as shown in FIGS. 2 and 3. The inclined surface 30 and the inclined surface 54 rest on the end of the slide 64 opposite to the free ends 74 and 76.

Accordingly, as the rear portions of the members 12 and 14 are moved toward each other, the inclined surfaces 30 and 54, because of their respective angles of inclination, exert a force on the slide 64 which is in a direction to force the free ends 74 and 76 against the respective hook-shaped portions 29 and 52. Hence, the slide is firmly clamped in place between the inclined surfaces and the respective hook-shaped portions of the members.

Continued movement of the rear portions of the members 12 and 14 toward each other causes the members to pivot about the end of the slide 64 opposite the free ends 74 and 76 thereby causing the hook-shaped portions 29 and 52 to respectively move upwardly and downwardly. In other words, the end of the slide 64 opposite the free ends functions as a fulcrum about which the members are free to pivot. This lever action causes the hook-shaped portions of the members to move apart or away from each other. Accordingly, the upper and lower portions 66 and 68 of the slide 64 move apart. Hence, after the halves 66 and 68 have moved apart a sufficient distance to permit removal of the slide from the fastener strip containing the fastener elements, the members 12 and 14 may be moved apart to release or unclamp the slide 64. Thereafter, the slide 64 may be removed from the fastener strip for replacement or repair.

It is to be noted that the tool 10 of the present invention may be utilized simply to unjam or loosen a slide which is immovable. Thus, in this application the upper and lower portions of the slide are moved apart only a distance sufficient to loosen the slide.

It should be noted that the operation of the tool 10 causes a steady and even opening force to be applied to the upper and lower portions of the zipper slide 64. That is, since the hook-shaped portion 29 of the projections 34 and 36 engage the upper portion 66 of the slide 64 adjacent each side edge of the free end 74, as shown in FIG. 2, and the hook-shaped portion 52 engages the free end 76 of the slide 64 at approximately the mid-point thereof, an evenly distributed force is applied to the slide 64. Accordingly, as the halves of the slide are moved away from each other, the evenly distributed force maintains an even spacing between the upper and lower portions of the slide thereby rendering the slide fit for re-use if desired.

Accordingly, a tool has been disclosed for easily and efficiently removing a slide from a slide fastener which is simple in construction and reliable in operation.

While a preferred embodiment of the present invention has been shown and described it will be obvious that numerous omissions, changes and additions may be made in such embodiment without departing from the spirit and scope of the invention. For example, the two members comprising the tool of the present invention need not be connected together. On the other hand, if the members are connected together any means may be employed to provide such connection such as deforming one of the members to fit a receptacle in the other member.

What is claimed is:

1. A tool for spreading apart the ends of a slide of a slide fastener comprising a first and a second member pivotably movable about a pivot point intermediate the ends of said members as well as toward and away from each other, corresponding opposed first ends of said first and second members having respective rearwardly directed hook-shaped portions adapted to be received about the free ends of the upper and lower portions of a slide, and complementary formed sloping surfaces on said first and second members, respectively, opposite their associated hook-shaped portions and adapted to engage the end of the slide opposite the free ends thereof, said sloping surfaces being so contoured to decrease the distance from each of said hook-shaped portions and the pivot point so as to force the slide received therebetween toward said hook-shaped portions when said first and second members are moved together whereby the slide is held between said hook-shaped portions and an angular abutment formed by the intersection of said complementary formed sloping surfaces so that when the second ends of said first and second members are moved together said first and second members pivot about a pivot point at the end of the slide against said angular abutment to spread apart the free ends of the slide by the moving apart of the hook-shaped portions at the first ends of said first and second members.

2. A tool as in claim 1, in which the hook-shaped portio nof said first member is defined in part by a forwardly and upwardly inclined surface, and said hook-shaped portion of said second member is defined in part by a forwardly and upwardly inclined surface.

3. A tool as in claim 1, in which said complementary formed surfaces comprise a downwardly extending surface on said first member inclined away from the hook-shaped portion of said first member, and an upwardly extending surface on said second member inclined away from the hook-shaped portion of said second member.

4. A tool as in claim 1, further comprising connecting means for interconnecting said first and second members for relative movement, said connecting means including an elongated slot in at least one of said first and second members, said slot being disposed behind the sloping surface of the associated member, and pin means passing through said slot and movably connecting said first and second members.

5. A tool as in claim 1, in which the hook-shaped portion of one of said first and second members includes a pair of projections in spaced relationship to each other, said pair of projections terminating in inclined surfaces which define said hook-shaped portion and which extend toward each other, whereby the operating lever of a slide is adapted to be received between said projections to facilitate operation of said tool.

6. A tool as in claim 1, in which said first member has a substantially U-shaped cross section, and said second member has a substantially flat cross section so that said second member slidably fits within said first member.

7. A tool as in claim 1, in which said first and second members are provided with respective arcuate slots, and a rivet received through said arcuate slots to connect together said first and second members.

References Cited

UNITED STATES PATENTS 2,542,201   2/1951   McDonald et al. ____ 29—239 X
2,594,789   4/1952   Morin.
3,218,696   11/1965  Dritz.

THOMAS H. EAGER, Primary Examiner

U.S. Cl. X.R,

29—239, 268